Jan. 31, 1967  F. A. MAULE  3,300,918
SURVEY STAKE PROTECTOR
Filed Jan. 8, 1964
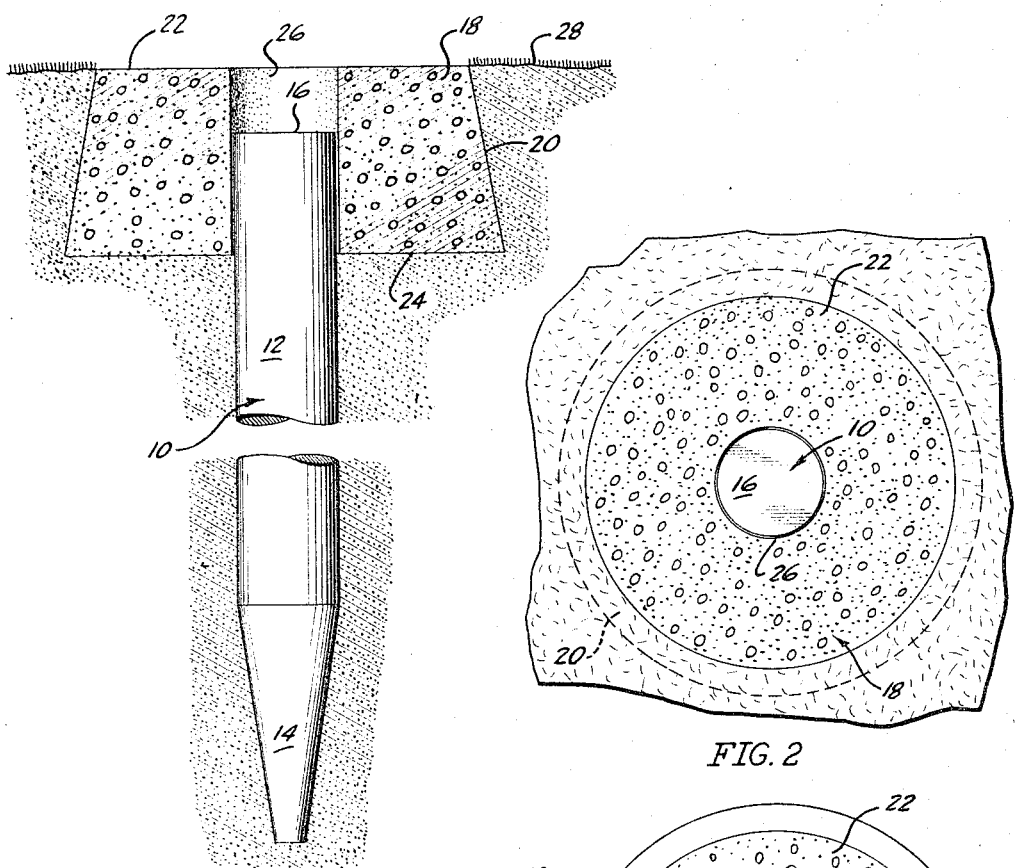
FIG.1
FIG.2
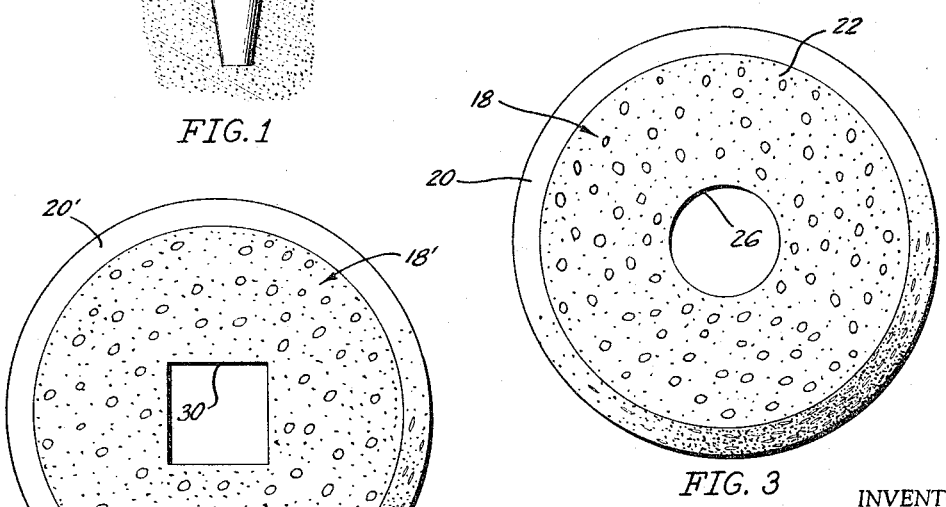
FIG.4
FIG.3
INVENTOR
FRANK A. MAULE
BY Beaman Beaman
ATTORNEY 3,300,918
SURVEY STAKE PROTECTOR
Frank A. Maule, 1018 S. Jackson St.,
Jackson, Mich. 49203
Filed Jan. 8, 1964, Ser. No. 336,448
1 Claim. (Cl. 52—103)

The invention pertains to a survey stake protector and monument, and assembly, wherein a survey stake may be embedded in the ground and is protected against damage and may be readily located.

It is common practice in the surveying art to employ survey stakes to indicate boundary lines, section corners, and other important locations. Normally, a survey stake is driven into the ground wherein the upper end is located close to the ground level. The stake upper end is usually either practically flush with the ground level or extends slightly thereabove. Although survey stakes are widely employed, many disadvantages are present with their use. Namely, survey stakes are often excessively driven into the ground inadvertently by a vehicle passing thereover, or intentionally by a farmer or landowner who considers the stake to be a hazard to mowing machines, agricultural equipment, etc. When the survey stake is driven into the ground wherein the upper end thereof is flush with the ground level, or slightly below, it becomes most difficult to locate the stake. When the upper end of the stake is left protruding above the ground it becomes a hazard and nuisance, and the stake is susceptible to damage and susceptible to being laterally displaced out of its proper position.

It is an object of the invention to provide a survey stake protector and monument marker which encompasses the upper end of the survey stake and permits the upper stake end to be located below the ground level, yet permits the stake to be readily located.

Another object of the invention is to provide a survey stake protector and monument marker assembly wherein the assembly includes a stake and a body member embedded in the ground having an upper surface substantially flush with the ground. The stake forms the center of the assembly indicating the exact position of the marker, while the body encompassing the end of the stake protects the stake and is of such a dimension as to be easily observed and located.

A further object of the invention is to provide a survey stake protector and monument marker assembly employing a body adapted to be embedded in the ground, and used in conjunction with a survey stake wherein the configuration of the body resists raising of the body from the ground due to frost or other ground movement.

These and other objects of the invention arising from the details and relationships of embodiments thereof will be apparent from the following description and accompanying drawings wherein:

FIG. 1 is an elevational, sectional view of a survey stake protector and monument marker assembly as constructed in accord with the invention and located within the ground, FIG. 2 is a plan view of the survey stake protector and monument marker assembly of FIG. 1, FIG. 3 is a plan view of the survey stake protector, per se, as employed in the illustrations of FIGS. 1 and 2, and FIG. 4 is a plan view of another embodiment of a survey stake protector wherein a rectangular survey stake may be employed therewith.

FIGS. 1 and 2 illustrate the assembly of a survey stake and protector and monument marker in actual use.

A survey stake is illustrated at 10 having an elongated body portion 12, a pointed lower end 14, and an upper end 16. In the embodiment of FIGS. 1 and 2, the body portion 12 of the survey stake is of a cylindrical configuration. Such stakes are commonly employed in the surveying art.

The survey stake protector and monument marker consists of a body member 18, preferably of a cast concrete construction, having a side wall 20, an upper surface 22, and a lower surface 24. In the illustrated embodiment, the body member 18 constitutes a truncated cone wherein the upper and lower surfaces 22 and 24 are parallel, and the side wall 20 is of a conical configuration, converging from the lower surface 24 in the direction of the upper surface 22. A coaxial hole or bore 26 is defined through the body 18 intersecting the upper and lower surfaces 22 and 24, through which the survey stake 10 extends, and is received therein.

In use, after the location of the stake 10 is determined, the stake may be driven into the ground a limited distance wherein the upper end 16 of the stake will be well above ground level. The surveyor will then dig a hole around the stake of a large enough diametrical dimension to receive the body member 18. The body 18 may then be slipped over the upper end of the stake 10 wherein the upper end of the stake is inserted into bore 26 and the body is located within the hole so that the upper surface 22 is substantially flush with the ground level 28, FIG. 1. The surveyor then fills in dirt around the body 18, and compacts the dirt whereby the body will be firmly embedded in the ground. The surveyor may then drive the surveyor stake 10 further into the ground until the upper end 16 is disposed below the upper surface 22 of the body 18. It will be appreciated, therefore, that as the stake upper end 16 is below the ground level and as the upper surface 22 of the body is substantially flush with the ground level, that the survey stake and body member assembly does not form an obstacle, as no part thereof extends above the ground surface. As the upper surface 22 is substantially flush with the ground level and is of a large enough dimension so as to prevent grass and weeds from readily growing thereover, the surveyor stake may be readily located and observed due to the ease of locating the upper surface of the body 18 protecting the stake.

The above described sequence of steps for installing and assemblying the stake and protector body is only one of several which may be employed, and it is to be understood that whether the hole to receive body 18 is dug before or after the stake 10 is fully set, is an optional matter with the person installing the assembly.

Once the surveyor stake and protecting body are assembled, as in FIG. 1, accidental displacement or damage to the assembly is unlikely. As the side wall 20 of the body converges in an upward direction, vertical movement of the body within the ground is resisted and, thus, "heaving" or rising, due to frost or other subterranean conditions, is not likely to occur. Also, lateral movement of the body 18 is resisted by the stake, as well as the fact that it is embedded in the ground, as the stake upper end 16 is located within the protector body 18. As the upper end 16 of the stake 10 is not covered by the body 18, the assembly permits the use of metal-finding devices for locating the stake protector and monument marker assembly should the assembly be located in a heavily overgrown environment or otherwise buried.

It will be noted that the lower surface 24 of the body 18 is of sufficient dimension to resist pushing of the body into the ground by a heavy vehicle, or the like, passing thereover, and by locating the upper end of the stake 10 below the body surface 22, even if the body 18 were depressed slightly into the ground, the upper end of the stake would not become a hazard.

The embodiment of FIG. 4 operates in an identical manner as the body 18 of FIGS. 1, 2, and 3, and similar components are indicated by primes. However, the bore 30 is of a rectangular configuration, whereby rectangular surveyor stakes may be employed with this embodiment.

I claim:

A survey stake and monument marker assembly comprising, in combination, a truncated, conical body embedded in the earth having a longitudinal axis and substantially parallel upper and lower surfaces, the conical side wall of said body converging from said lower surface in the direction of said upper surface, an axially extending hole defined within said body and concentrically extending therethrough intersecting said surfaces, and a stake within said hole having a lower end and an upper end and having an axial length greater than the axial length of said body, said stake being embedded in the earth to a depth whereby said stake upper end is disposed below said body upper surface and said stake lower end extends below said body lower surface.

References Cited by the Examiner

UNITED STATES PATENTS

| | | | |
|---|---|---|---|
| 86,476 | 2/1869 | Webb | 52—297 |
| 196,561 | 10/1877 | Chandler | 52—297 |
| 573,777 | 12/1896 | Fry | 52—297 |
| 748,946 | 1/1904 | Hansberger | 52—297 |
| 931,568 | 8/1909 | Collier | 52—298 |
| 1,950,335 | 3/1934 | Weatherstone | 61—12 |
| 2,154,966 | 4/1939 | Vanderveer | 52—103 |
| 2,687,788 | 8/1954 | Rapp | 52—103 |
| 3,193,059 | 7/1965 | Wallerstein | 52—297 |

FRANK L. ABBOTT, *Primary Examiner.*

JOHN E. MURTAGH, *Examiner.*